(12) United States Patent
Noles, Jr. et al.

(10) Patent No.: US 9,027,672 B2
(45) Date of Patent: May 12, 2015

(54) METHOD OF COMPLETING A WELL USING A FRICTION REDUCING COMPLETION FLUID

(71) Applicant: Coil Chem, LLC, Newcastle, OK (US)

(72) Inventors: Jerry W. Noles, Jr., Blanchard, OK (US); Alex J. Watts, Rayville, LA (US)

(73) Assignee: Coil Chem, LLC, Newcastle, OK (US)

( * ) Notice: Subject to any disclaimer, the term of this patent is extended or adjusted under 35 U.S.C. 154(b) by 0 days.

(21) Appl. No.: 14/219,614

(22) Filed: Mar. 19, 2014

(65) Prior Publication Data

US 2014/0202709 A1    Jul. 24, 2014

Related U.S. Application Data

(62) Division of application No. 13/075,465, filed on Mar. 30, 2011, now Pat. No. 8,714,255.

(51) Int. Cl.
| | |
|---|---|
| *C09K 8/584* | (2006.01) |
| *E21B 41/02* | (2006.01) |
| *C09K 8/03* | (2006.01) |
| *C09K 8/28* | (2006.01) |
| *C09K 8/54* | (2006.01) |
| *E21B 29/00* | (2006.01) |
| *C09K 8/588* | (2006.01) |

(52) U.S. Cl.
CPC . *E21B 41/02* (2013.01); *C09K 8/03* (2013.01); *C09K 8/28* (2013.01); *C09K 8/54* (2013.01); *C09K 2208/28* (2013.01); *C09K 2208/32* (2013.01); *E21B 29/00* (2013.01); *C09K 8/588* (2013.01)

(58) Field of Classification Search
None
See application file for complete search history.

(56) References Cited

U.S. PATENT DOCUMENTS

| | | | |
|---|---|---|---|
| 3,933,656 A | 1/1976 | Reick | |
| 5,100,950 A * | 3/1992 | Carlson et al. | 524/490 |
| 5,700,767 A * | 12/1997 | Adams | 508/539 |
| 5,886,066 A | 3/1999 | Forschirm | |
| 7,325,631 B2 * | 2/2008 | Roberts et al. | 175/300 |
| 2012/0129735 A1 * | 5/2012 | Dino et al. | 507/129 |

OTHER PUBLICATIONS

USPTO Non-Final Office Action and References Cited, Mailing date Nov. 19, 2014, pp. 1-8.

* cited by examiner

*Primary Examiner* — Angela M DiTrani
(74) *Attorney, Agent, or Firm* — Tumey L.L.P.

(57) ABSTRACT

A method for reducing the friction forces between tubulars, for example coiled tubing in casing includes mixing a selected suspending agent and surfactant and polymer particles in oil, then adding the mixture to water and pumping the mixture down the tubing. The mixture is particularly useful in coiled tubular drilling inside casing of an oil or gas well. The formulation has also been found to reduce corrosion on metal surfaces.

7 Claims, 2 Drawing Sheets

METHOD OF COMPLETING A WELL USING A FRICTION REDUCING COMPLETION FLUID

This application is a divisional application of a U.S. application Ser. No. 13/075,465 filed Mar. 30, 2011, now U.S. Pat. No. 8,714,255.

BACKGROUND OF INVENTION

1. Field of the Invention

This invention is directed to a method for reducing the drag caused by friction between metal tubulars in a well during completion or drilling operations in the well. More particularly, chemical additives and polymer particles in an oil phase are added to a water-based fluid such that the particles are transported to an oil film on the surface of the tubulars. The materials disclosed also reduce the amount of corrosion on surfaces of tubulars.

2. Description of Related Art

In recent history the oil and gas industry has discovered that drilling horizontally within an oil and gas reservoir can potentially make a much more productive well. The horizontal well allows access to much larger volumes of the oil- and gas-bearing formation. The longer the lateral or horizontal section the more productive the well can be. For this reason, it has become increasingly common to drill horizontally in many oil and gas formations that are being developed today—particularly in the low-permeability shale formations.

Steel casing is placed in the wellbore and, in many wells, the casing is perforated at a selected number of locations along the horizontal section of the wellbore with clusters or sets of perforations. This starts the process of "completing" the well. The number of sets of perforations may vary from two to forty or more. Hydraulic fracturing fluid is then pumped through each set of perforations—one set at a time. It is common to separate flow in the casing to each set of perforations by setting a drillable bridge plug between them. After hydraulic fracturing treatments have been pumped through each set of perforations, the bridge plugs must be drilled from the casing to allow production up the well from the different sets of perforations.

The length of the horizontal section of the well can be limited by the process of drilling bridge plugs from the casing. Drilling of bridge plugs is often performed with a fluid motor and bit on the end of coiled tubing by pumping a water-based fluid down the tubing, through the motor and bit, and back up the annulus inside the casing. Drilling may also be performed by a workover rig with a power swivel to rotate jointed pipe and turn the bit. The friction between the coiled tubing or jointed pipe and the casing in the horizontal section of the well may become equal to the force available to move the coiled tubing or pipe along the horizontal section, at which point further drilling is not possible. The force available to move the pipe is determined by weight of the pipe in the vertical section of the well and, in some cases, by the force that can be applied by pushing on the pipe with a snubbing mechanism at the surface. When jointed pipe is used, the pipe can be rotated along with the bit and the friction resisting movement of the pipe along the wellbore is decreased, but with coiled tubing the lack of pipe rotation causes higher friction resisting movement along the wellbore. But, even with jointed pipe in wells where the wellbore has been drilled with directional changes, causing "doglegs" or a crooked wellbore, the rotation of jointed pipe and movement along the wellbore may be limited. This means that drilling rigs can sometimes drill longer laterals than completion equipment can complete.

In the past, polymer beads have been mixed with fluids and circulated into the well to reduce friction in both drilling and coiled tubing workovers (*J. Can. Pet. Tech.*, November 1996, p. 7). The effectiveness of these beads in coil tubing and workover applications inside the casing has been limited. It is believed that this is a result of no mechanism to cause the beads to be concentrated in the area where they are needed most—at the metal-to-metal contacts. Consequently, a better friction-reducing fluid is required to reduce friction between coiled tubing and casing caused by the metal-to-metal contact in a water-based fluid. This type of friction reduction is unrelated to the step of adding water-soluble polymers to the water-based fluid to reduce fluid pressure losses during pumping.

BRIEF SUMMARY OF THE INVENTION

Chemical additives are added to oil and the oil is dispersed in water and pumped down a well in completion or drilling operations in casing. Polymer particles, for example polytetrafluoroethylene, along with a suspending agent and a surfactant to oil-wet steel are added to the oil. The oil may also contain a dispersion of water-soluble polymer or other chemicals. Metal-to-metal friction is reduced when coiled tubing or jointed pipe is used in a cased well.

BRIEF DESCRIPTION OF THE SEVERAL VIEWS OF THE DRAWING(S)

DETAILED DESCRIPTION

Figure 1:
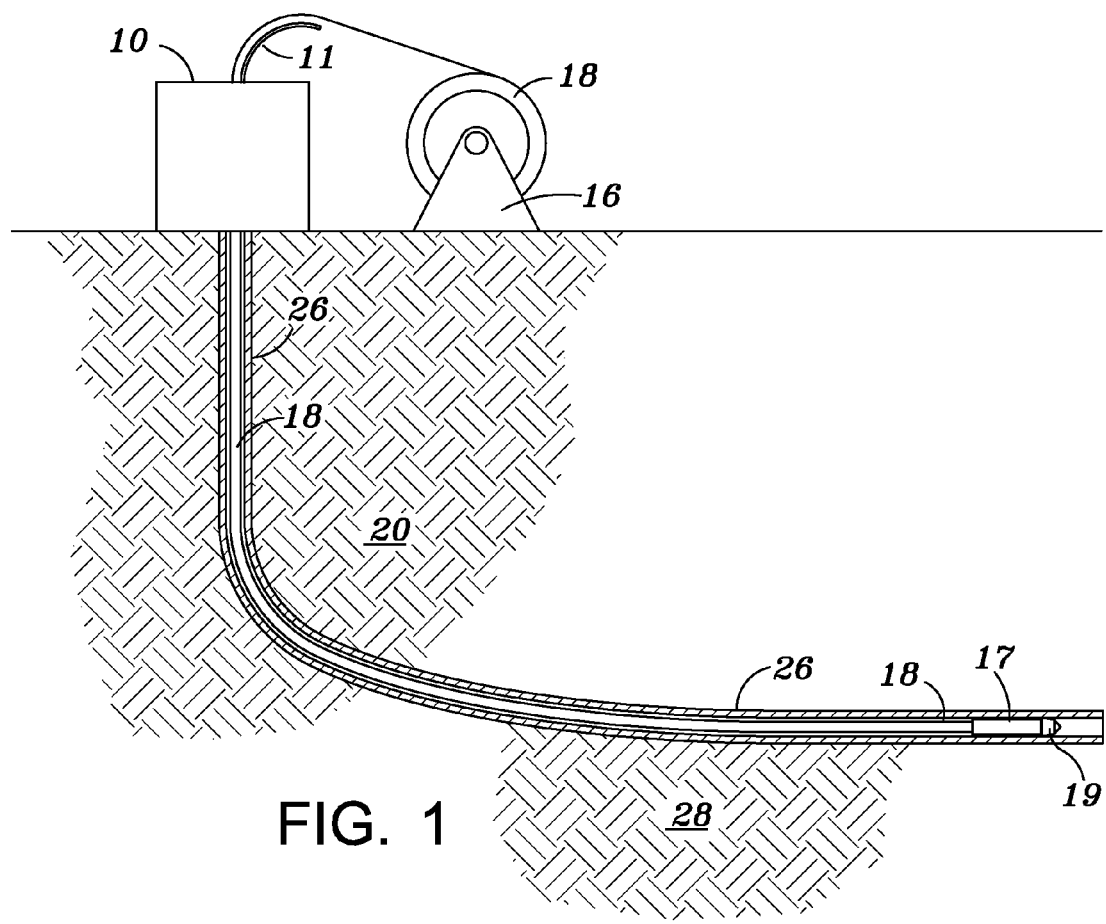
FIG. 1 is an overall view of a horizontal well configuration.

FIG. 1 illustrates a typical coiled tubing drilling apparatus in a horizontal well having wellhead 10. Support 16 holds a reel of coiled tubing 18, which is guided over curved support 11 into the well. Wellhead 10 may include a blowout preventer, a snubbing mechanism or other conventional equipment. The well is cased with casing 26 that extends within the well bore through formations 20 in the vertical section of the well and through formation 28 in the horizontal section.

For certain well completion processes, such as drilling bridge plugs from casing 26, coiled tubing 18 is lowered into the well and enters the horizontal section of casing 26, which is normally cemented in formation 28. Turbine or motor 17 and bit 19 may be attached to the distal end of the tubing 18 to drill out devices such as bridge plugs (not shown) that have been inserted into the horizontal section of the casing. For drilling, fluid is pumped through tubing 18, motor 17 and bit 19 and returns to the wellhead through the annulus between tubing 18 and casing 26.

Figure 2:
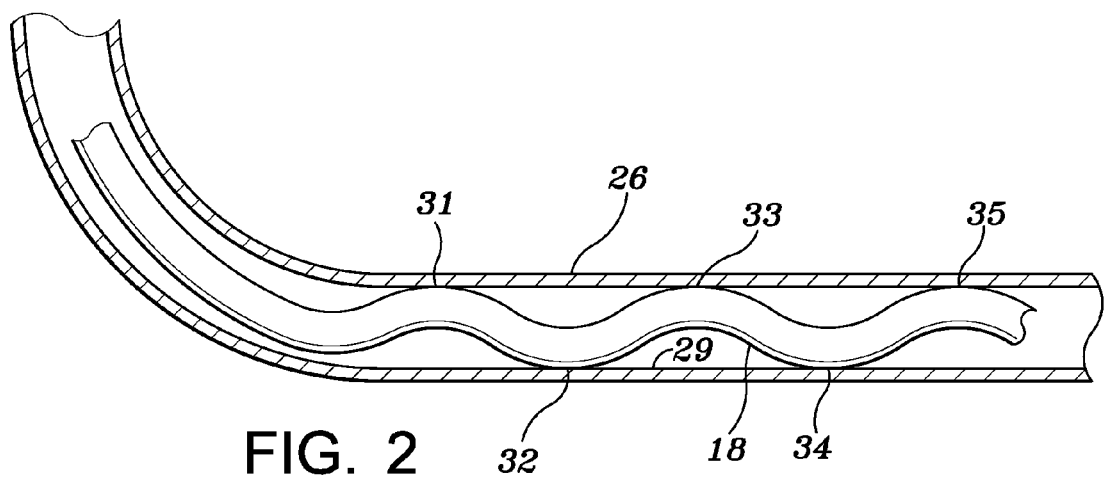
FIG. 2 is a sectional view of a horizontal portion of the horizontal well with coiled tubing located within the casing of the well.

As tubing 18 is pushed through the horizontal portion of the casing, metal-to-metal contact occurs with the interior surface 29 of the casing at points 31-35, shown in FIG. 2. Friction increases the force required to place the tubing in the well and may limit the length that the tubing can be placed in the horizontal portion of the casing. The present invention reduces the friction at contact areas such as points 31-35.

Water-soluble polymers are frequently used in drilling and completion fluid to reduce pressure loss while pumping and to improve the ability of the fluid to carry solids out of a well. The method of adding a water-soluble polymer to water by first dispersing the polymer in oil and then adding the polymer-containing oil phase to water is well known. This method minimizes or avoids clumping of the polymer when it is added to water. Dispersions of water-soluble polymer, such as polyacrylamide, in oil are commercially available. The oil breaks into droplets such that water contacts the polymer and disperses it in the water phase. Improved apparatus and method for mixing oil and water to introduce water-soluble polymers through a dispersion in oil is disclosed in a patent application filed on Nov. 3, 2010 and having the same inventor as the first-named inventor of the present application, ("Polymer Blending System," Ser. No. 12/952,373) The improved apparatus may also be used to mix the oil phase disclosed herein and water.

The present disclosure entails adding additional chemicals to the oil phase before it is mixed with the water and pumped down a well. Polymer particles are added to provide low friction between metal surfaces. Other solid polymer particles may also be selected. Preferably, the polymer has a low friction coefficient with metal. To make the polymer particles fully effective, it was found that the particles must be concentrated near the metal surfaces. This is provided by first dispersing the polymer particles in the oil phase and adding chemicals to help suspend the polymer particles in oil and to cause the oil to preferentially wet or attach to the metal surfaces. The polymer particles is then transported to the surface of the tubing and casing in oil droplets and concentrated near the metal surfaces in an oil film. This allows movement of tubing in casing with reduced force and may extend the length that pipe can be inserted into a well bore. polymer particles can provide great mechanical lubrication between steel parts if it is concentrated near the surfaces, even in a water-based fluid. Polymer particles at the same concentrations dispersed in water is less effective, as will be shown below. Therefore, the invention utilizes a vehicle or transport system to assure proper deposition of the polymer particles on or near the metal surfaces.

Polymer particles is first added to the oil phase. Preferably, a suspending agent such as colloidal suspension of ethylene bis-amide in the oil is used to hold the polymer particles in suspension while it is in the oil phase before the oil is added to water. The concentration of bis-amide preferably is in the range from 3% to 7% by weight. Other suspending agents may be used, such as fumed silica or organophbilic clays. The oil may also contain a dispersion of water-soluble polymers, as explained above. The deposition of polymer particles on the pipe surfaces is achieved by carrying the polymer particles in the oil phase prior to introduction into the pumped fluid, then forming oil droplets that carry the polymer particles to an oil film that is formed on the metal surfaces. Formation of the oil film is made possible by the use of a surfactant, for example Polyethylene Glycol 600 Dioleate Tallate (intermediate product made by McAllen Chemical from Tall oil), which is used to oil-wet the metal surfaces. The surfactant must have an HLB number (Hydrophilic-Lipophilic Balance) such that oil droplets can be formed without creating a stable emulsion. Because the surfactant and hydrocarbon wet the steel surfaces, the droplets of oil attach to the surface of the pipes, effectively holding the polymer particles to the pipe wall rather than allowing it to be carried out of the well with the pumped fluid. This hydrocarbon and polymer particles film provides excellent lubrication to areas of metal-to-metal contact within the well bore.

The particles of polymer particles are preferably in the range of 1-100 microns in diameter and are made by DuPont. The oil phase carrying the polymer particles and surfactants is added to the base fluid, water, using conventional mixing equipment. The oil phase is typically added at a rate of 1 gal of oil phase per 10 bbls of water, which is a volume ration of 1 to 420. The oil may be naphthenic, paraffinic, or aromatic hydrocarbon, preferably paraffinic, a synthetic oil, such as an organosiloxane fluid, an oil from a plant, such as vegetable oil, or other environmentally preferred oil. The surfactant must provide oil-wetting of metal surfaces without forming a stable emulsion. It is believed that the oil droplets, with TEFLON inside, spread over the interior and exterior surfaces of the pipe. The TEFLON and hydrocarbon film provides excellent lubrication to areas of metal-to-metal contact within the well bore.

Figure 3:
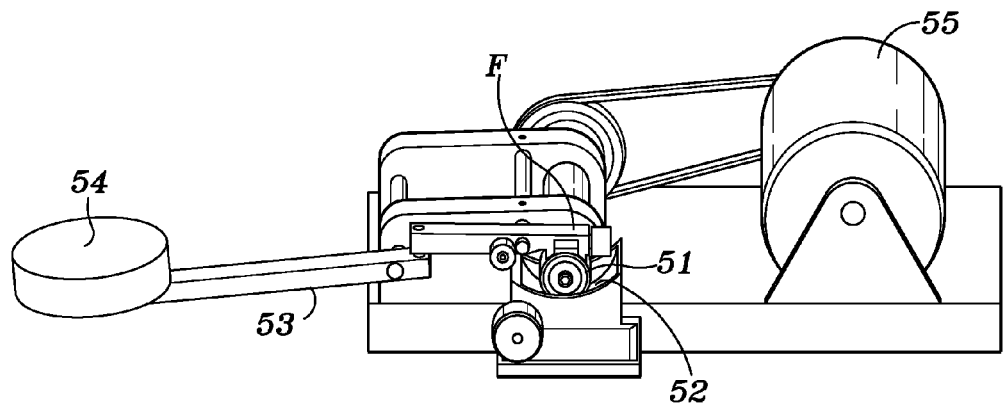
FIG. 3 is a perspective view of the friction-testing device used to test fluids.

A sketch of the device that was used to evaluate the performance of the fluids disclosed herein is shown in FIG. 3. This bench-top friction tester is manufactured by Justice Brothers Lubricants and is intended for evaluating the performance of lube oil additives. Force F of a metal bar is applied to rotating metal bearing surface 51. Cup 52 surrounding the bottom quarter of the rotating bearing surface provides a reservoir to hold the fluid being tested. Force is applied to lever 53 by placing weight 54 on one end of the lever. A 1-pound weight applies a force of 100 psi to the bearing surface. The performance of the fluids is measured by observing the amperage draw of 110 volt one-quarter HP motor 55 used to rotate the bearing with a constant force on the bearing. Amperage is recorded in 5-second intervals. The testing is complete when galling of the bearing surface is heard or current drawn by the motor reaches 10 amps.

Example 1

A 200 gram sample was prepared by mixing a 0.5% solution of the composition given in Table 1 into distilled water and mixing in a 200 mL beaker with magnetic stirring for 3 minutes.

TABLE 1

| | |
|---|---|
| Hydrocarbon oil | 91.2% by wt. |
| Ethylene bis-amide | 5% by wt. |
| Polyethylene Glycol 600 dioleate tallate | 2% by wt. |
| TEFLON Particles | 1.8% by wt. |

The sample was then quickly poured into cup 52 (FIG. 3). While holding the weight off the static bearing surface, the unit was turned on to allow the solution to coat the bearing surface. After a brief time, arm 53 was lowered to apply a force of 200 pounds on the bearing surfaces and the timer was started. After completion of a test, the cup was removed from the tester and cleaned with isopropyl alcohol. The bearing surfaces were removed and replaced with new ones. Tests were performed with the mixture of Example 1 and with other fluids.

Figure 4:
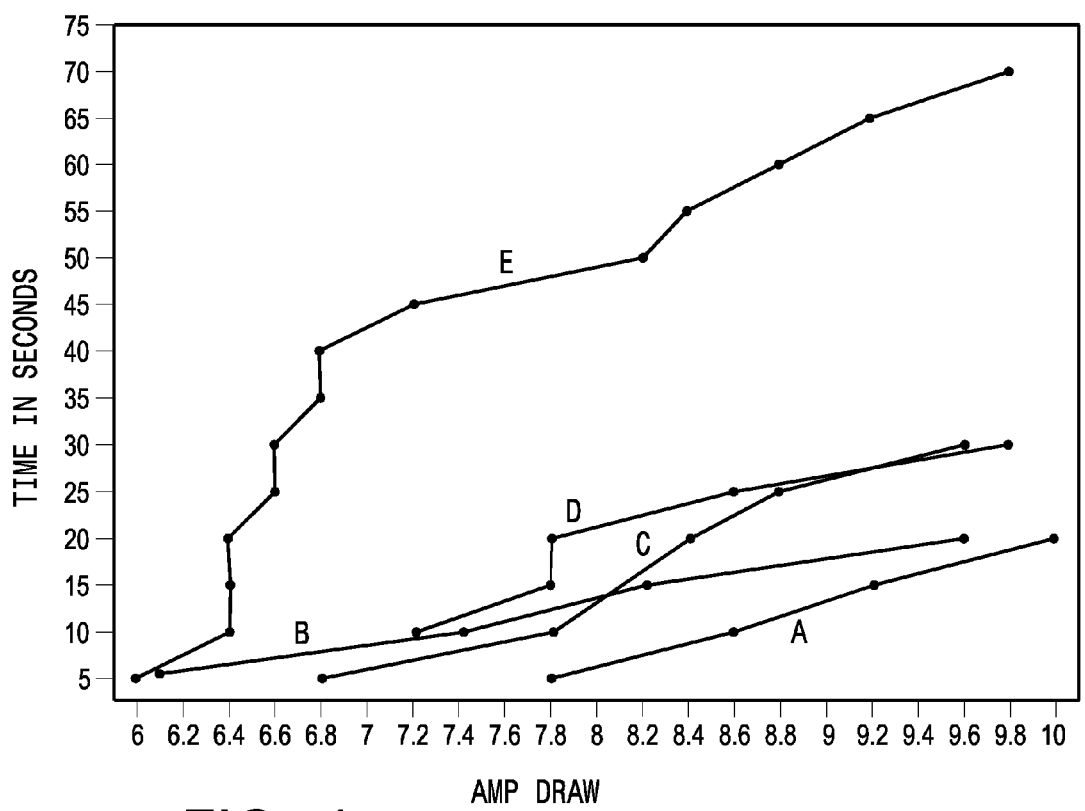
FIG. 4 is a graph of the results of tests using the test apparatus of FIG. 3.

FIG. 4 is a graph showing the amperage drawn by the motor over a period of time with different fluids in the test apparatus illustrated in FIG. 3. Lines A, C, and D, represent results for products presently used for completions in the oil and gas industry. Line B represents results for a mixture of TEFLON and water. Line E represents results for the composition of Example 1.

The graph clearly indicates that products A-D resulted in an amperage draw approaching 10 in a much shorter time period than that of the composition disclosed above and in Example 1. Compositions A-D led to currents approaching 10 amps in 20-30 seconds, whereas the formulation disclosed here led to currents approaching 10 amps after 70 seconds.

Example 2

A well operator had set 10 bridge plugs inside casing in the horizontal section of a well in Texas. Operations to drill the bridge plugs were conducted using coiled tubing. The well had a vertical depth of about 8,290 ft and had a measured depth of about 13,220 ft. Coiled tubing had been used to drill all plugs but the bottom two plugs. Using a prior art friction reducing fluid, friction limited the ability to drill the last two plugs. The decision was made to try the oil phase composition disclosed herein. After adding the oil phase mixture disclosed in Example 1 to water at rates of 1 or 2 gals per 10 bbls and circulating the present fluid up the annulus outside the coiled tubing, the final two plugs were reached and drilled. In a second well drilled from the same pad as the first well, friction was higher than in the first, but all the plugs were successfully drilled from the well using the composition disclosed herein. The representative of the well operator who was present during the drilling operations commented that he did not believe all the plugs could have been drilled without the use of the materials disclosed herein.

The concentrations given in Example 1 may be varied over a broad range. The concentration of TEFLON particles may range from about 1% by weight to about 8% by weight. The concentration of ethylene bis-amide may vary from about 1% to about 10%. Tests can be used to determine an effective amount of suspending agent. The concentration of surfactant may range from about 1% to about 5%. Tests such as described above can be used to determine an effective amount of surfactant.

The formulation of the present invention has also been found to inhibit corrosion on metal surfaces. Pieces of ¼-in plate were cut into 2-in×5-in strips and their surface ground to bare metal. Two were used as a control and not coated with anything. One strip was sprayed with a 10 lb/gal brine and one was not. Both were set outside in atmospheric conditions. Two of the strips were treated with a solution of polyacrylamide in water, which is the composition of fluids used in many completion, workover and fracturing operations. One of these was sprayed with a 10 lb/gal brine and one was not. Both were set outside in atmospheric conditions. The other two strips were treated with oil containing surfactant TEFLON as disclosed herein. One was then sprayed with brine and one was not. Both were put outside in atmospheric conditions. After five days in atmospheric conditions, the strips treated with the oil containing surfactant and TEFLON disclosed herein showed corrosion (rust) on less than 15% of the surface, while the other samples had rust on 100% of the surface area. The samples treated with the polyacrylamide fluid showed no better corrosion resistance than the control plates that had no treatment. Surface rust for the control plate treated with the 10 lb/gal brine was noticeably thicker than the one that was not sprayed. This held true for both the control plate and the one treated with polyacrylamide. The surface area for both the control plates and those treated with polyacrylamide had rust on 100% of the surface area.

The corrosion tests show that the fluid disclosed herein provides corrosion protection to steel surfaces in a well after contact with the fluid. This means that the oil, surfactant friction reducer containing TEFLON can be pumped on an intermittent basis to provide corrosion protection and friction reduction on the surfaces of tubulars in a well.

Although the present invention has been described with respect to specific details, it is not intended that such details should be regarded as limitations on the scope of the invention, except to the extent they are included in the accompanying claims.

We claim:

1. A method for drilling a bridge plug from casing in a well, comprising:
    a) placing tubing in the well, the tubing having a bit at a distal end;
    b) preparing a liquid mixture containing
        i. an oil,
        ii. a suspending agent,
        iii. polymer particles,
        iv. a surfactant namely polyethylene glycol 600 dioleate tallate to cause the oil to wet the surfaces of the casing and tubing; and
        v. water; and
    c) pumping the mixture through the tubing and the bit and into an annulus between the tubing and the casing while rotating the bit to drill out the bridge plug.
2. The method of claim 1 wherein the oil is selected from the group consisting of hydrocarbon, synthetic or plant oil and mixtures thereof.
3. The method of claim 1 wherein the polymer particles are in the size range from about 1 to about 100 microns.
4. The method of claim 1 wherein the oil further contains a dispersion of a water-soluble polymer.
5. The method of claim 1 wherein the tubing is coiled tubing.
6. The method of claim 1 wherein the mixture is pumped through the tubing intermittently with water.
7. The method of claim 1 wherein the polymer particles are polytetrafluoroethylene.

* * * * *